United States Patent [19]

Airhart

[11] Patent Number: 4,991,685
[45] Date of Patent: Feb. 12, 1991

[54] DOWNHOLE SEISMIC SOURCE

[75] Inventor: Tom P. Airhart, Plano, Tex.

[73] Assignee: Atlantic Richfield Company, Los Angeles, Calif.

[21] Appl. No.: 415,618

[22] Filed: Oct. 2, 1989

[51] Int. Cl.⁵ .................................................. G01V 1/40
[52] U.S. Cl. .................................... 181/106; 181/113; 181/121
[58] Field of Search ............... 181/106, 113, 119, 121; 367/25

[56] References Cited

U.S. PATENT DOCUMENTS

| | | | |
|---|---|---|---|
| 4,569,412 | 2/1986 | Bouyoucos et al. | 181/119 |
| 4,648,478 | 3/1987 | Dedole et al. | 181/106 |
| 4,702,343 | 10/1987 | Paulsson | 181/106 |
| 4,747,466 | 5/1988 | Jaworski | 181/113 |
| 4,770,268 | 9/1988 | Magneville | 181/106 |

OTHER PUBLICATIONS

Paulsson, "Three-Component Downhole Seismic Vibrator", Presented at 58th Annual International SEG Meeting (1988), *Expanded Abstracts*, 139–142.

Primary Examiner—Charles T. Jordan
Assistant Examiner—J. Woodrow Eldred
Attorney, Agent, or Firm—Vinson & Elkins

[57] ABSTRACT

A downhole seismic generator that can be located in various positions in the well including being located in engagement with the bottom of the well bore and that includes a large striker mass driven by compressed gas into engagement with an anvil having one end located in engagement with the medium in which the seismic signals are to be set up. Retractor means is provided to return the mass to the ready position so that a series of seismic signals can be provided as desired. Optional baffle means connected to the generator prevent waves from traveling through the well bore which would otherwise diminish or confuse the seismic shock wave initially generated.

A downhole seismic generator that can be located in various positions in the well including being located in engagement with the bottom of the well bore that includes a vibrator piston located in a reaction mass and driven by a hydraulic system to cause reciprocation of the piston to set up vibrations in the medium to which the lower end of the piston is exposed.

40 Claims, 9 Drawing Sheets

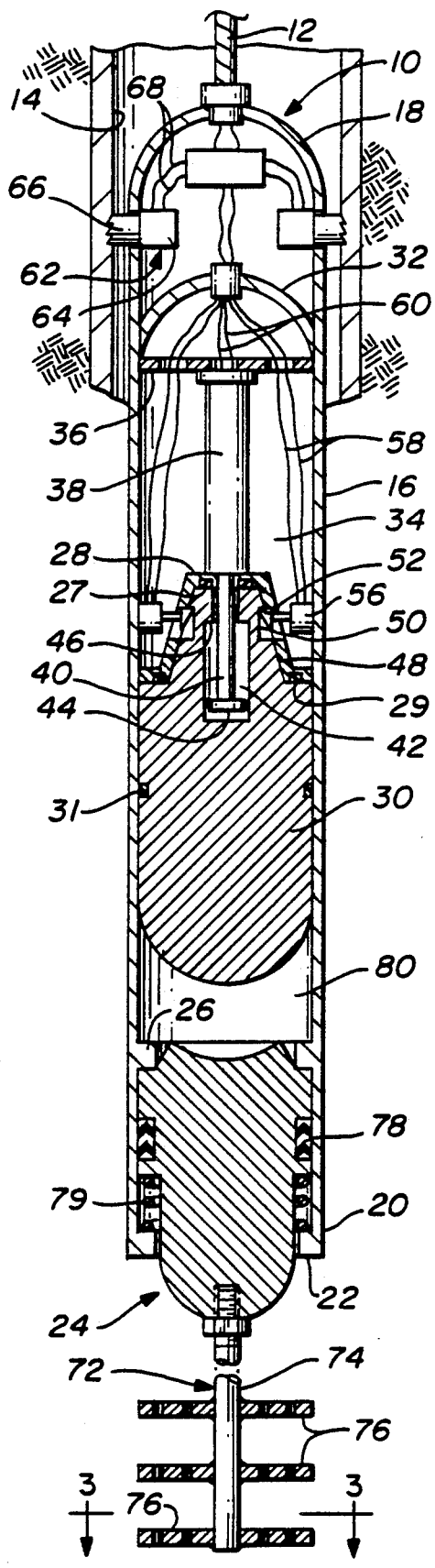

4,991,685

DOWNHOLE SEISMIC SOURCE

TECHNICAL FIELD OF THE INVENTION

This invention relates generally to apparatus for generating seismic signals. More particularly, but not by way of limitation, this invention relates to a source for generating seismic signals that is located in a well bore or the like.

BACKGROUND OF THE INVENTION

U.S. Pat. No. 4,569,412 issued Feb. 11, 1986, to John V. Bouyoucos et al. describes a down hole seismic source. In that patent, the signal is generated by a hammer that is hydraulically driven and impacts on a piston assembly which is prebiased against the side of the hole.

U.S. Pat. No. 4,715,470 issued Dec. 29, 1987, to Bjorn N. P. Paulsson. This patent describes an electromagnetic driven seismic source. The downhole tool is secured to the wall of the well bore and a reaction mass is driven to impart shear waves into the surrounding formation. (See also U.S. Pat. No. 4,702,343 issued Oct. 27, 1987 to Paulsson).

In U.S. Pat. 4,648,478 issued Mar. 10, 1987, to Pascal Dedole et al., a large mobile mass is utilized to engage a target element within the apparatus to create a shock which is transferred into the well bore wall through elongated shoes which are pressed against the well bore wall by hydraulic cylinders.

U.S Pat. No. 4,747,466 issued May 31, 1988, to Bill L. Jaworski. This patent describes apparatus wherein a mass is accelerated using force generated by the surrounding high pressure liquid in the well bore. The seismic signal is generated by moving the mass into a dashpot arrangement which creates a controlled deceleration, and thus a shock wave is generated.

It is highly desirable that a downhole seismic source be capable of operation in cased wells as well as in open holes, that is, in noncased well bores. Also, it is highly desirable that such apparatus be capable of being used in shallow or deep well bores.

SUMMARY OF THE INVENTION

An object of this invention then is to provide improved downhole seismic signal generating apparatus that can be used in open or cased well bores and that can be used in shallow or deep holes equally effectively. This invention provides improved downhole apparatus for generating seismic signals that includes: an elongate, hollow body arranged to be lowered into a well bore on a conducting cable; signal generating means located in the body; and control means located in the body for activating the signal generating means to produce the seismic signal.

BRIEF DESCRIPTION OF THE DRAWING

The foregoing and additional objects and advantages of the invention will become more apparent as the following Detailed Description is read in conjunction with the accompanying Drawing, wherein like reference characters denote like parts in all views and wherein:

FIG. 2 is a vertical, cross-sectional view of a portion of the apparatus of FIG. 1.

FIG. 4 is a view similar to FIG. 2, but illustrating the apparatus in another operating position.

DETAILED DESCRIPTION OF THE PREFERRED EMBODIMENT

Figure 1:
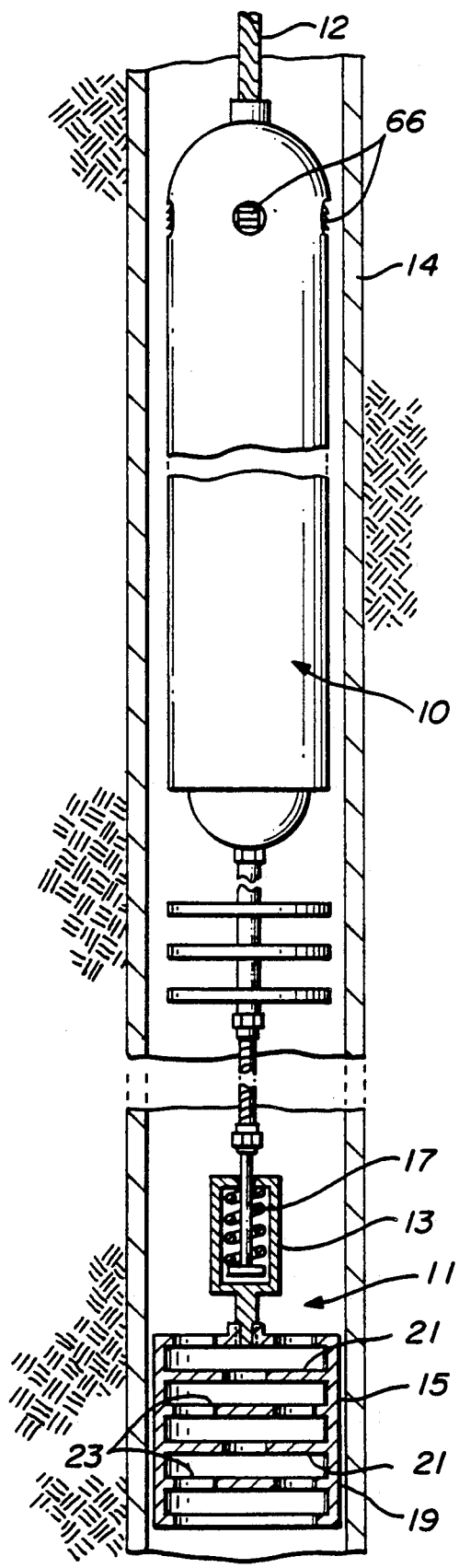
FIG. 1 is an elevation view of a downhole seismic generator that is constructed in accordance with the invention and located in a well bore.

Referring to the Drawing and to FIG. 1 in particular, shown therein and generally designated by the reference character 10 is a downhole seismic signal generator that is illustrated as being suspended by a conducting cable 12 in a cased well bore 14.

Suspended from the signal generator 10 is an optional damper assembly 11. The damper or baffle assembly 11 includes a shock absorber 13 which is located between a damper 15 and the generator 10. The distance from the generator 10 to the damper assembly 11 is sufficient to permit the imposition of the initial shock wave. However, it should be located at a position to prevent the formation and travel of subsequently formed waves.

As illustrated, the shock absorber 13 includes a compression spring 17 arranged between telescoping members. Any suitable shock absorber can be used in lieu of that shown.

The damper 15 includes a hollowing housing 19 having a plurality of spaced baffle plates 21 and 23 therein. Each of the plates has ports extending therethrough for preventing the direct passage of fluid through the housing 19.

The seismic signal generator 10 includes, as can be seen more clearly in FIG. 2, an elongated hollow body 16 having an upper end 18 connected to the cable 12 and an open lower end 20 having an inturned flange 22 thereon. The flange 22 is provided to prevent an anvil assembly, designated by the reference character 24, from being discharged from the open end 20 of the body 16. The body 16 also includes an inwardly projecting flange 26 that serves to limit the upward movement of the anvil assembly 24.

A stop and seal member 28 on the body 16 serves the functions of limiting the upward movement of a striker mass 30, which is slidingly located in the body 16, and sealingly engaging the mass 30. Seals 27 and 29 are located on member 28 providing fluid-tight seals with the mass 30. An annular seal 31 encircles the mass 30 forming a sliding seal with the body 16.

Near the upper end 18 of the body 16 there is provided an inner seal member 32. The seal member 32 in conjunction with the body 16 and the upper end of the striker mass 30 forms a high pressure gas chamber 34, which is filled with high pressure gas for purposes that will be explained.

A perforated mounting plate 36 extends across the body 16. One end of a retractor drive 38 is connected thereto. A retractor rod 40 extends from the other end of the retractor drive 38 into a cavity 42 formed in the striker mass 30. A retractor flange 44 of larger diameter than the retractor rod 40 is provided on the free end of the rod 40. The flange 44 is designed to engage a downwardly-facing retractor shoulder 46 that is located on the striker mass 30 within the cavity 42.

The conical upper portion of the striker mass 30 has an external tapering surface 48 just below the seal 27. The taper of the surface 48 is preferably almost vertical to reduce the project area affected by the pressure.

An annular recess 50 is provided in the conical upper portion that is arranged to receive latch members 52, which may be seen more clearly in FIG. 4. As illustrated, the latch members 52 are provided with tapering end surfaces 54, which are arranged to mate with the surface 48 on the striker mass 30.

As illustrated in FIG. 2, the striker mass 30 is latched in a ready position by the latch members 52 engaging the cylindrical portion of the striker mass 30 in the annular recess 50. Each of the latch members 54 is movable radially toward and away from the recess 50 by a solenoid 56. The solenoids 56 are connected by conductors 58 with a triggering mechanism (not shown) at the surface of the well. It should also be pointed out that, as illustrated, the solenoids are preferably of a type wherein the latch members 54 are biased toward the center of the housing 16 by means of springs. Consequently, the latch members 54 automatically engage the surface 48 when the mass 30 is raised so that the latch members 54 lock the striker assembly 30 in the ready position illustrated in FIG. 2.

The retractor drive 38 is connected by means of conductors 60 to a control system at the surface of the well. Although illustrated as being a hydraulic system, an electromechanical transducer, or pneumatic system could be utilized for the retractor drive 38. The elements of the hydraulic system are contained in the upper part of the housing and omitted in this illustration for simplicity. The system is energized and controlled by electrical energy from the surface through 12.

At the upper end 18 of the housing 16 there are provided a plurality of anchors 62, each of which includes solenoid actuator 64 and an anchor shoe 66 that is reciprocable toward and away from well bore or casing wall 14. The purpose of the anchors 62 is to lock the housing 16 to the well bore wall. In the preferred form of the invention, the anchor shoes are each constructed to include resilient material so that the seismic signal generator 10 will not be locked solidly to the casing but so that limited movement thereof can occur to prevent generation of a secondary seismic wave.

Each of the solenoid actuators 64 is connected by conductors 68 with the control system (not shown) at the surface of the well through the conducting cable 12. The solenoids 64 and 56 have each been described as being electro-mechanical devices or transducers. It should be apparent that if desired, each of those items could be pneumatically or hydraulically actuated.

Figure 3:
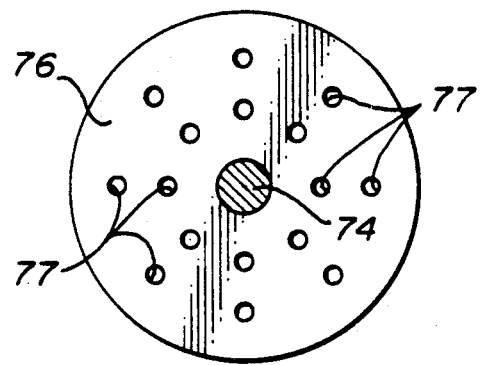
FIG. 3 is a transverse, cross-sectional view taken generally along Line 3—3 of FIG. 2.

The anvil assembly 24 includes an anvil member 70, and a shock assembly 72. The shock assembly 72 includes an elongated support member or rod 74 connected to and projecting downwardly from the anvil member 70 and includes a plurality of spaced shock members 76 mounted on the rod 74. The length of the shock assembly and number of shock members is designed to impart a shock wave to the well bore fluid as a result of the initial movement of the anvil member 70. As shown in the cross-sectional view of FIG. 3, each of the shock members 76 is annular in configuration and is perforated to include plurality of spaced holes 77 extending therethrough.

It will be noted in FIG. 2 that the exterior of the anvil member 70 is provided with a chevron-type seal 78 providing a fluid-tight seal between the movable anvil member 70 and the body 16. An anvil spring 79 is located within the body 16 and has one end in engagement with the flange 22 and the other end in engagement with the anvil member 70 to bias the anvil member toward the position shown in FIG. 2.

A low pressure chamber 80 is formed in the lower portion of the body 16 by the body 16, the seal 78, the anvil 70 at one end, and the seals 29, the body 16 and the striker mass 30 at the other end. It will also be noted that the striker mass 30 is constructed relative to the body 16 so that gas in the chamber 80 will not be compressed to high pressure by the mass 30 as it moves from the FIG. 2 position to the FIG. 4 position to restrict movement of the mass.

OPERATION OF THE EMBODIMENT OF FIG. 1

As previously mentioned, the striker mass 30 is shown in FIGS. 1 and 2 in the ready position. That is, the gas in the chamber 34 is highly compressed, and except for the engagement of the latch members 52 with the mass 30, the gas would drive the striker mass 30 downwardly. Accordingly, when it is desired to create the seismic signal, a trigger mechanism (not shown) at the surface is actuated, pulling the latch dogs 54 radially outwardly by means of the solenoids 56 and releasing the striker mass 30. The mass 30 is driven at high velocity downwardly until it strikes the anvil assembly 24.

Near the upper end of the conical upper portion of the mass 30, the seal 27 carried by the member 28 engages the mass 30 and at the top of the cylindrical portion of the mass 30 the seal 29 carried by the member 28 also engages the mass 30. The seal arrangement prevents the application of the high pressure in the chamber 34 to the top of the mass. However, and due to the slight taper of the upper conical portion, the slightest movement of the mass 30 downwardly, exposes the entire upper surface of the mass 30 to the effect of the high pressure gas in the chamber 34.

Upon striking the anvil 24, the anvil 24 is driven sharply downwardly transmitting mechanical shock energy to the borehole fluid, and with further movement, compressing the spring 79 which brings the anvil assembly 24 to a stop. The sudden movement of the anvil member 70 and the connected shock assembly 72 causes a wave in the fluid in the well bore that creates a seismic signal. The signal is propagated through the formations adjacent to the well bore to sensors (not shown) used for receiving and recording the seismic signals.

The wave created by sudden movement of the anvil member 70 and shock assembly 72 may also set up a series of other waves which move through fluids in the well bore 14. Such waves may cause interfering seismic signals to be generated which may result in blurred or distorted seismic signals received. To prevent such an occurrence, the baffle assembly 15 has been provided which attenuates secondary wave action.

As can be appreciated from FIG. 1, the initial shock wave generated will displace the damper 15 slightly downwardly with the shock being absorbed in the shock absorber 13. Fluid can flow through the damper 15, but it must flow through a tortuous path and, thus, secondary wave action is virtually prevented.

As illustrated in FIG. 4, downward movement of the striker mass 30 has stopped and the anvil assembly 24 has reached its lowermost position. To restore the striker mass 30 to the ready position for additional wave generation, the spring 79 located adjacent to the lower end 20 of the body 16 exerts an upward force on the anvil 24, biasing the mass 30 upwardly. Also, there is a differential between the pressure existing in the well and that in the low pressure chamber 80, which also assists in restoring the anvil assembly 24 to its ready position.

After the anvil assembly 24 returns to its ready position, surface controls (not shown) are actuated, causing the retractor drive 38 to move the retractor rod 40 upwardly. When this occurs, the flange 44 on the lower end thereof engages the downwardly facing retractor shoulder 46 of the striker mass 30, raising the striker mass 30 with the rod 40 returning the mass 30 to its ready position.

When the tapered surface 48 on the exterior of the cylindrical portion 32 of the striker mass 30 engages the sloping surfaces 54 on the latch members 52, the latch members 52 are cammed relatively outwardly until the recess 50 passes the top end of the latch members 52. When this occurs, the latch members 52 are driven by springs (not shown) in the solenoids 56 into the recess 50, thereby securely latching the striker mass 30 in the ready position.

After the mass 30 has been returned to the ready position, the surface control is again actuated to extend the retractor rod 40 to the position shown in FIG. 2 so that the mass 30 can move downwardly without engaging the flange 44 on the rod 40. The foregoing procedure can be repeated as required.

MODIFICATION OF FIGS. 5 AND 6

Figure 5:
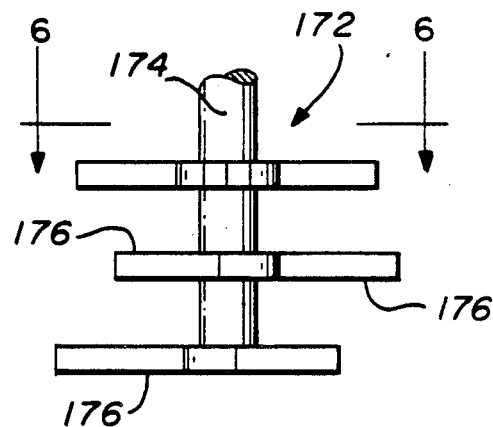
FIG. 5 is a fragmentary view of a modified baffle that is useful in conjunction with the apparatus of FIG. 1.
Figure 6:
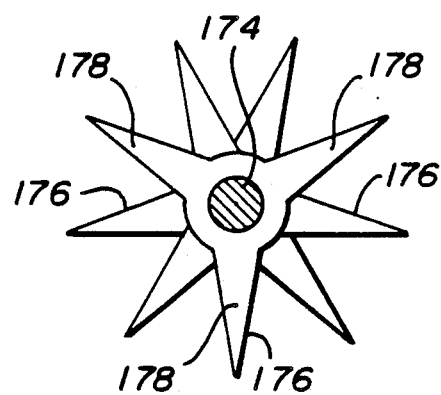
FIG. 6 is a transverse, cross-sectional view taken generally along the Line 6—6 of FIG. 5.

The fragmentary view of FIGS. 5 and 6 illustrate a modification of the shock assembly 72 that is designated by the reference character 172. The shock assembly 172 includes a support member or rod 174 onto which there are mounted a plurality of spaced shock members 176.

As illustrated most clearly in FIG. 6, each of the shock members 176 includes three arms 178, which are disposed at an angle of about 120 degrees relative to the other arms in each member 176. With three of the shock members 176 mounted on the rod 174, the arms are circumferentially displaced to form the configuration illustrated in FIG. 6.

EMBODIMENT OF FIG. 7

Figure 7:
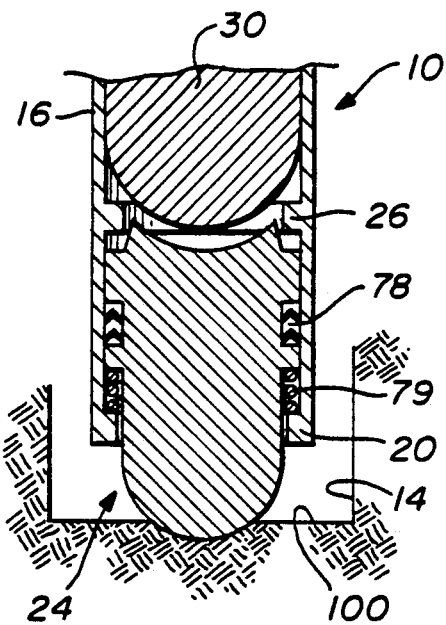
FIG. 7 is a partial, cross-sectional view of a modified form of the seismic generator of FIG. 1 disposed at the bottom of a well bore.

The fragmentary view of FIG. 7 is constructed as was the seismic signal generator 10 except that the optional damper assembly 11 has been removed therefrom. Since the apparatus illustrated is the same as previously described with the exception of removal of optional portion thereof, the same reference characters will be utilized in describing the apparatus shown in FIG. 7.

The signal generator 10 has been positioned with the lowermost end of the anvil assembly 24 resting on a bottom 100 of the well bore 14. The anvil assembly 24 is located in the casing 16 in the position to be impacted by the striker mass 30 as previously described in connection with the operation of FIG. 1.

In all respects, the apparatus 10 as illustrated in FIG. 7 operates as did the apparatus shown in FIGS. 1–4. However, and as clearly illustrated, the apparatus 10 has been lowered to the bottom 100 of the well bore 14. The seismic signals generated upon impact of the striker mass 30 with the anvil assembly 24 are now transmitted directly into the earth at the bottom 100 of the well bore 14 instead of into liquid located in the well bore as described in connection with the operation of the generator 10 when located up the bore with the anvil assembly 24 positioned in the liquid in the well bore.

EMBODIMENT OF FIG. 8

Figure 8:
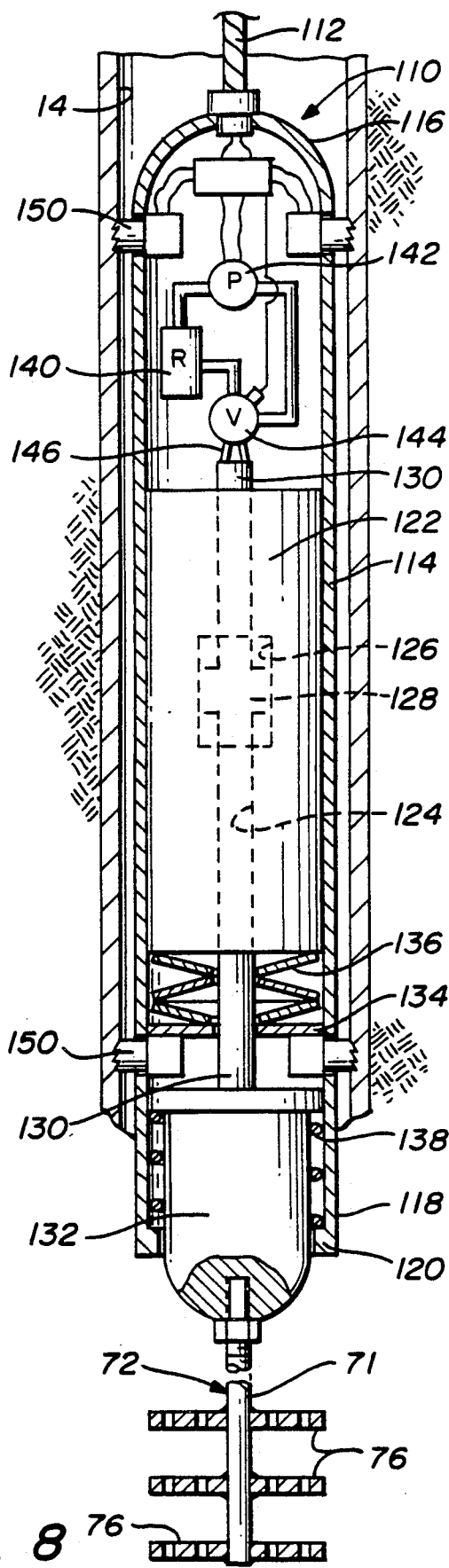
FIG. 8 is a view, partly in elevation and partly in cross-section, of another embodiment of a downhole seismic generator that is also constructed in accordance with the invention and located in a well bore.

FIG. 8 illustrates a signal generator 110 of the vibration type that is arranged to be lowered into the well bore 14 on a cable 112. The generator 110 includes a hollow-bodied 114 having an upper end 116 connected to the cable 112 and an open lower end 118 that includes a interned flange 120 for reasons that will be explained hereinafter. Located within the housing 114 is a reaction mass 122 that has a bore 124 extending axially therethrough. A center portion of the bore 124 is enlarged at 126 to receive a vibrator piston 128.

As illustrated in FIG. 8, the vibrator piston 128 includes an elongated portion 130 that extends outwardly of the upper end of the reaction mass 122 and a lower end 130 that extends from the lower end of the reaction mass 122. The lower end of the member 130 is connected to a shock member 132 that projects through the open lower end 118 of the housing 116. The lowermost end of the member 132 is in engagement with liquid located within the well bore 14. To further enhance the vibration set-up by the apparatus 10, there is connected to the lower end of the member 132 an optional shock assembly 72 which was previously described in detail in connection with the embodiment of FIGS. 1 and 2.

Within the housing 114, there is provided an inwardly projecting flange 134 between the reaction member 122 and the member 132. A resilient spring assembly 136 has one end resting on the flange 134 and the other in engagement with the lower end of the reaction member 122 to resiliently support the reaction member 122.

A spring 138 is located between the member 132 and the inwardly directed flange 120 on the lower end of the housing 114 to resiliently support the member 132.

At the upper end 116 of the housing 114, there is provided a control and vibration energizing system which receives its power through the cable 112. As shown schematically therein, a liquid reservoir 140 is interconnected with a hydraulic pump 142 and with a control valve 144. The valve 144 is connected by a conduit 146 with the piston 128 to cause reciprocating or vibratory motion of the piston 128. The generator 110 is also provided with a plurality of anchors 150, a portion of which are located near the upper end 116 of the body 114 and a portion of which are located near the lower end 118 thereof. The anchors 150 are provided to fix the position of the generator 110 in the well bore 14.

OPERATION OF THE EMBODIMENT OF FIG. 8

In operation, the generator 110 is lowered into the well bore 14 on the cable 112. Upon reaching the desired location in the well bore 14, the anchors 150 are actuated to position the generator. The control system is then actuated through the cable 112 to actuate the pump and control the valve 144 to set up reciprocation of the piston 128. Such reciprocating motion causes a corresponding reciprocating movement of the member 132 and the shock assembly 72 to set up the vibrations in the liquid in the well bore 14 which are subsequently transferred into the surrounding formation.

The reaction member 122 functions during reciprocation to set up vibrations in the piston 128 and at the same time to reduce, or essentially eliminate vibration of the housing 114.

EMBODIMENT OF FIG. 9

Figure 9:
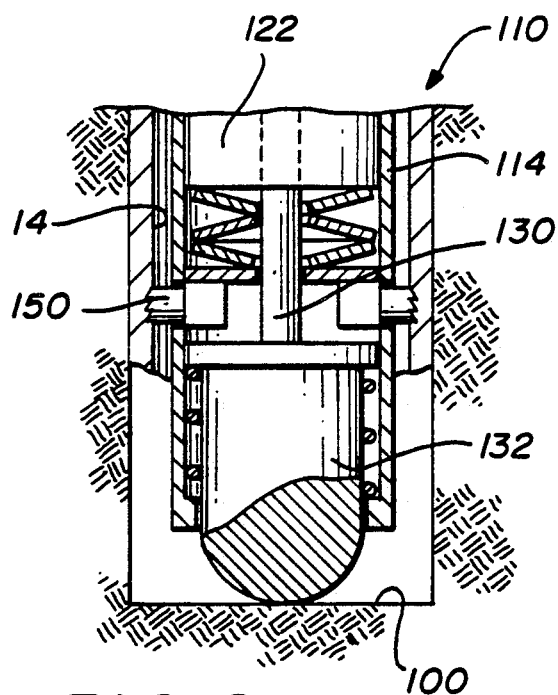
FIG. 9 is a view of a portion of a modified form of the seismic generator of FIG. 8 located at the bottom of a well bore.

In FIG. 9, the optional shock assembly 72 has been removed and the generator 110 has been lowered into the well bore 14 until the lower end of the member 132 rests on the bottom 100 of the well bore 14. The arrangement is such that upon initiation of a reciprocating or vibratory movement of the piston 128, the member 132 vibrates in engagement with the bottom 100 of the well bore 14 and consequently transmits vibrational signals directly into the earth at the bottom of the well bore.

Accordingly, the downhole seismic generator apparatus described in detail hereinbefore, both the impact type and the vibratory type, will efficiently and consistently generate seismic signals as required and can be utilized to generate such signals in different locations in the well bore.

It will be understood that the embodiments described in detail hereinbefore may be changed and modified without departing from the spirit and scope of the invention.

What is claimed is:

1. Improved apparatus for generating downhole seismic signals comprising:
    an elongate hollow body arranged to be lowered into a well bore;
    signal generating means in said body operably having a lower portion located at the distal end of said body so that, when lowered into the well bore, said lower portion is in contact with a medium into which said seismic signals are to be transmitted; and
    control means in said body for activating said signal generating means to create said seismic signals in said medium with said lower portion.

2. The apparatus of claim 1 wherein said signal generating means also includes a reaction mass located in said body for reducing vibration of said body.

3. Improved apparatus for generating downhole seismic signals comprising:
    an elongate hollow body arranged to be lowered into a well bore;
    a striker mass movably located in said body;
    an anvil movably located in said body relatively below said striker mass and engageable thereby, said anvil having a lower end exposed to fluid in the well bore when said body is lowered into the well bore;
    a high pressure gas chamber in said body defined by an upper surface on said striker mass and by said body, so that gas in said gas chamber propels said striker mass toward and into engagement with said anvil to generate said seismic signal; and
    shock means connected to the lower end of said anvil and projecting downwardly therefrom for enhancing the seismic signal; and
    control means in said body for releasing said striker mass to be propelled by gas in said gas chamber.

4. Improved apparatus for generating downhole seismic signals comprising:
    an elongate hollow body arranged to be lowered into a well bore;
    an actuator piston movably located in said body and having a lower end engaging, when lowered into the well bore, the medium into which said seismic signals are to be generated;
    a reaction mass located in said body for reducing vibration of said body, and having a cylinder formed therein for receiving said actuator piston;
    a reaction mass support member located in said body between said reaction mass and said body, said reaction mass support member being tuned to prevent movement of said reaction mass relative to said body; and
    control means in said body for activating said actuator piston to generate said seismic signals.

5. Improved apparatus for generating downhold seismic signals comprising:
    an elongate hollow body arranged to be lowered into a well bore;
    signal generating means in said body operably having a lower portion located so that, when said body is lowered into the well bore, said lower portion is in contact with a medium into which said seismic signals are to be transmitted;
    a support member connected to said lower portion;
    a plurality of wave generating shock members spaced along said support member; and
    control means in said body for activating said signal generating means to generate said seismic signals.

6. Improved apparatus for generating downhole seismic signals comprising:
    an elongate, hollow body arranged to be lowered into a well bore;
    a striker mass movably located in said body;
    an anvil movably located in said body relatively below said striker mass and engageable thereby, said anvil having an upper end and having a lower end exposed to fluid in the well bore;
    a high pressure gas chamber in said body defined by an upper surface on said striker mass and by said body, whereby said gas propels said striker mass toward and into engagement with said anvil to create said seismic signal;
    shock means connected the lower end of said anvil and projecting downwardly therefrom for enhancing the seismic signal; and,
    latch means in said body for releasably retaining said striker mass in a ready position out of engagement with said anvil.

7. The apparatus of claim 6 and also including a low pressure gas chamber in said body defined by said striker mass, said body, and by the upper end of said anvil.

8. The apparatus of claim 6 and also including retraction means in said body for returning said striker mass to the ready position.

9. The apparatus of claim 8, wherein said shock means includes:
    a support member connected to said anvil; and,
    a plurality of shock members spaced along said support member.

10. The apparatus of claim 9, wherein each said shock member comprises a perforated disc.

11. The apparatus of claim 9, wherein:
    each said shock member includes a plurality of radially projecting, circumferentially spaced arms; and,
    the arms of each said shock member are circumferentially displaced relative to other shock members.

12. The apparatus of claim 8, wherein said striker mass has a retraction shoulder thereon and wherein said retraction means includes:
   a retraction rod movable with respect to said striker mass and engageable therewith, said rod having a flange on one end thereof; and,
   means for moving said retraction rod between a first position out of engagement with the retraction shoulder on said striker mass and a second position engaging the retraction shoulder on said striker mass for moving said striker mass to said ready position.

13. The apparatus of claim 6 and also including anchor means in said body for selectively securing said body at desired locations in the well bore.

14. The apparatus of claim 13, wherein said anchor means includes:
   a plurality of anchor shoes engageable with the well bore wall; and,
   anchor drive means for moving said shoes into and out of holding engagement with the well bore wall.

15. The apparatus of claim 14, wherein said shoes are resilient to permit limited movement of the apparatus relative to said well bore wall in response to forces generated by movement of said striker mass.

16. The apparatus of claim 6, and also including baffle means located in the well bore below said anvil.

17. The apparatus of claim 16 wherein said baffle means includes:
   a baffle member;
   suspension means connecting said baffle member to said anvil.

18. The apparatus of claim 17 wherein said baffle member includes a shock absorber connected to said suspension means.

19. The apparatus of claim 18 wherein said baffle member has a tortuous fluid flow path therethrough.

20. Improved apparatus for generating downhole seismic signals comprising:
   an elongate, hollow body arranged to be lowered into a well bore;
   anchor means in said body for securing said bore at desired locations in a well bore, said anchor means including a plurality of resilient anchor shoes engageable with the well bore wall, and anchor drive means for moving said shoes into and out of holding engagement;
   a striker mass movably located in said body and having a retraction shoulder thereon;
   an anvil movably located in said body below said striker mass, said anvil having an upper end engageable thereby and having a lower end exposed to fluid in the well bore;
   a high pressure gas chamber in said body defined by an upper surface on said striker mass and by said body hereby said gas propels said striker mass toward and into engagement with said anvil to create said seismic signal;
   retraction means in said body for returning said striker mass to a ready position out of engagement with said anvil, said retraction means including a retraction rod movable with respect to said striker mass and having a flange on one end engageable with the retraction shoulder on said striker mass, and means for moving said retraction rod between a first position out of engagement with said retraction shoulder and a second position engaging said retraction shoulder for moving said striker mass to said ready position;
   shock means connected to the lower end of said anvil and projecting downwardly therefrom for enhancing said seismic signal, said shock means including a support member connected to said anvil and a plurality of shock members spaced along said support member;
   latch means in said body for releasably retaining said striker mass in said ready position out of engagement with said anvil; and
   a low pressure gas chamber in said body defined by a lower end of said striker mass, by said body, and by the upper end of said anvil.

21. The apparatus of claim 20, wherein each said shock member comprises a perforated disc.

22. The apparatus of claim 20, wherein:
   each said shock member includes a plurality of radially projecting, circumferentially spaced arms; and
   the arms of each said shock member are circumferentially displaced relative to other shock members.

23. The apparatus of claim 20, wherein:
   said anchor drive means includes an electromechanical transducer for each said shoe;
   said means for moving said retraction rod includes an electromechanical transducer; and,
   said latch means includes an electromechanical transducer for actuating said latch means.

24. The apparatus of claim 20 and also including baffle means located in the well bore below said anvil.

25. The apparatus of claim 24 wherein said baffle means includes:
   a baffle member;
   suspension means connecting said baffle member to said anvil.

26. The apparatus of claim 25 wherein said baffle member includes a shock absorber connected to said suspension means.

27. The apparatus of claim 26 wherein said baffle member has a tortuous fluid flow path therethrough.

28. Improved apparatus for generating downhold seismic signals comprising:
   an elongate, hollow body arranged to be lowered into a well bore;
   a reaction mass located in said body for reducing vibration of said body;
   an actuator piston movably located in said body and having a lower end which, when said body is lowered into the well bore, engages a medium into which said seismic signals are to be generated;
   a cylinder in said reaction mass for receiving said piston; and
   control means in said body for causing reciprocation of said actuator piston to set up vibrations in said medium.

29. The apparatus of claim 28, further comprising:
   shock means connected to the lower end of said actuator piston and projecting downwardly therefrom for enhancing the seismic signal.

30. The apparatus of claim 29, wherein said shock means includes:
   a support member connected to said actuator piston; and
   a plurality of shock members spaced along said support member.

31. The apparatus of claim 29, wherein each said shock member comprises a perforated disc.

32. The apparatus of claim 29, wherein:

each said shock member includes a plurality of radially projecting, circumferentially spaced arms; and the arms of each said shock member are circumferentially displaced relative to other shock members.

33. The apparatus of claim 28 and also including anchor means in said body for selectively securing said body at desired locations in the well bore.

34. The apparatus of claim 33, wherein said anchor means includes:

a plurality of anchor shoes engageable with the well bore wall; and, anchor drive means for moving said shoes into and out of holding engagement with the well bore wall.

35. The apparatus of claim 1 wherein said medium comprises a liquid located in a well bore.

36. The apparatus of claim 1 wherein said medium is the earth at the bottom of a well bore.

37. The apparatus of claim 20 wherein said medium comprises a liquid located in a well bore.

38. The apparatus of claim 20 wherein said medium is the earth at the bottom of a well bore.

39. The apparatus of claim 28 wherein said medium comprises a liquid located in a well bore.

40. The apparatus of claim 28 wherein said medium is the earth at the bottom of a well bore.

* * * * *